March 13, 1934.　　　S. S. CRAWFORD　　　1,950,841
APPARATUS FOR DISPOSING OF SEWAGE
Filed Oct. 3, 1932
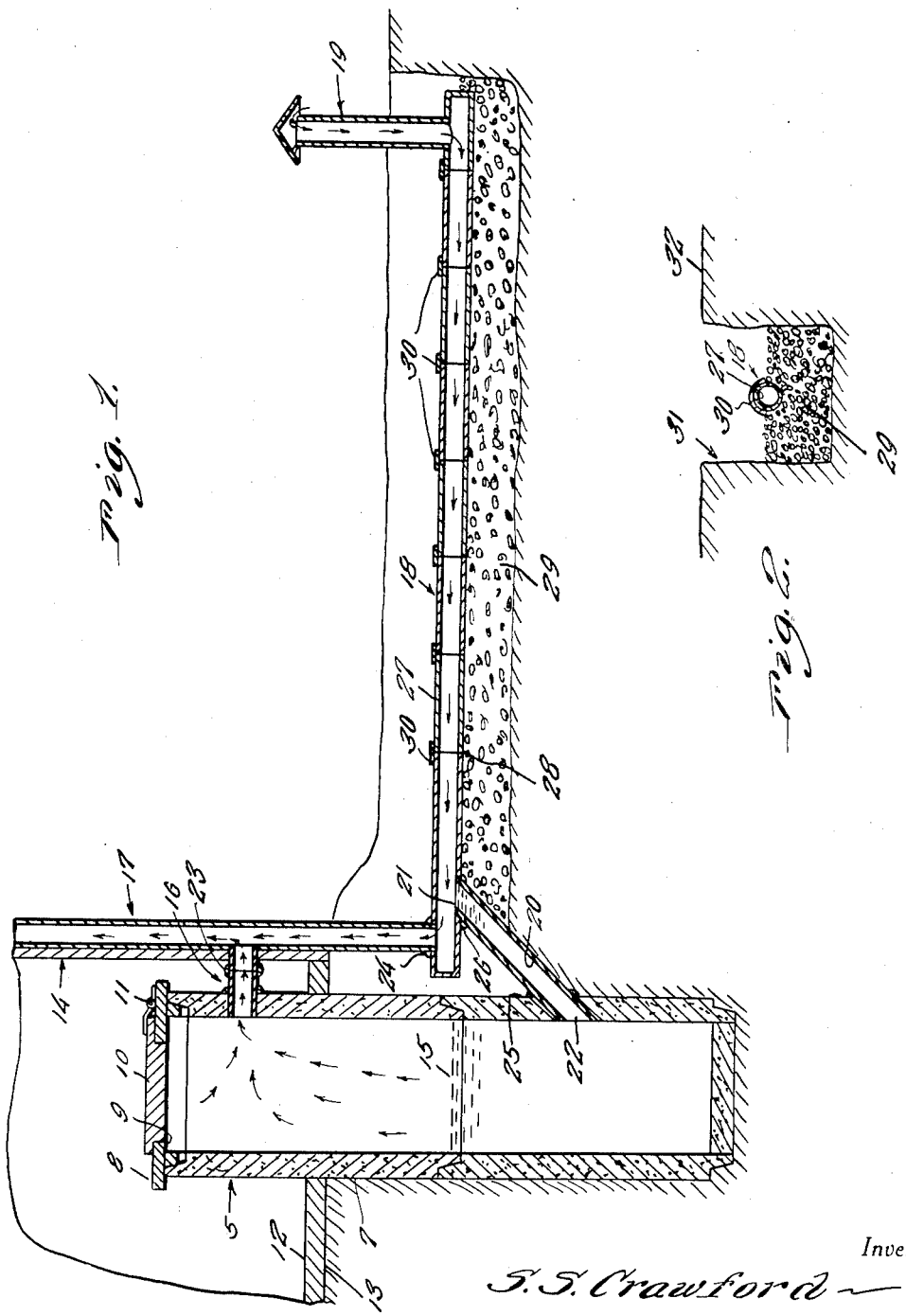
Inventor
S. S. Crawford
By Clarence A. O'Brien
Attorney Patented Mar. 13, 1934

1,950,841

UNITED STATES PATENT OFFICE 1,950,841

APPARATUS FOR DISPOSING OF SEWAGE

Sinclair S. Crawford, Lake Charles, La.

Application October 3, 1932, Serial No. 636,057

3 Claims. (Cl. 210—6)

My invention relates to a method and means for disposing of sewage, and particularly to a method and apparatus for disposing of sewage which is collected in a septic tank.

An important object of my invention is to provide a method and apparatus for carrying out the same wherein a filter is used in connection with air ducts and a gas conducting duct, and sewage conducting ducts, whereby the noxious gases produced by the sewage in the septic tank are positively carried and discharged into the exterior atmosphere, and the sewage reduced to liquid form in the septic tank and carried therefrom to be filtered and disposed of by seepage into the ground, whereby contamination of the soil adjacent devices of this character is prevented.

It is also an important object of my invention to provide a method and an apparatus for carrying out the same whereby sewage is disposed of by being liquefied and purified and introduced into the ground, without contaminating the soil, which apparatus can be installed and operated at a minimum cost by unskilled labor.

It is also an important object of my invention to provide a method and an apparatus for carrying out the same whereby the energy developed in the septic tank in the form of heated gas is made to act to positively effect circulation of fresh air through the apparatus and carry contaminated air or gas therefrom, thereby bringing about a continuous circulation of and changing of the air in the apparatus, thereby promoting better activity of the liquefying and purifying operations which take place in the apparatus, thereby further reducing the danger of polluting the adjacent soil into which the purified and liquefied sewage is finally introduced.

It is also an important object of my invention to provide a method and an apparatus of the type described above wherein the effluent from the septic tank is gravitationally conveyed from the septic tank to the filter and gravitationally introduced into the ground.

In the drawing:

Figure 1 is a longitudinal sectional view showing an apparatus for carrying out the process of the invention, and Figure 2 is a transverse sectional view through Figure 1.

The method of my invention comprises the provision of a septic tank 5 whose lower portion 6 may be made of concrete or other suitable masonry properly sealed against escape of liquid and gas, and whose upper section 7 which may likewise be made of masonry material or of some other suitable material, and has its top closed by a close fitting table 8 which is readily removable for cleaning purposes. The table 8 has an opening which is closed in a manner to keep out flies and other vermin, and prevent the escape of noxious gases therefrom, by a cover 10 hinged as indicated at 7. A suitable pavement 12 may cover the top of the ground 13 and surround the intermediate portion of the upper section 7 in a building or house the wall of which is generally designated 14. It will be seen that the upper end of the lower section 6 is considerably below ground level and embedded in the ground. The numeral 15 designates the level of the liquid in the lower section 6 which will be constantly maintained against rising thereabove by means to be described. Into the section 6 may be introduced by pouring or dropping through the opening in the top 8 any well known chemicals or other agents for promoting liquefaction of matter which is subsequently introduced therein in an obvious manner.

The first step of the process is liquefaction of the sewage collected in the lower section 6 of the septic tank 5 and the confining in the septic tank of the gases produced by the activity of such chemicals or other agents in the liquid contents of the septic tank.

Advantage is taken of the production and expansion of the gases from the liquid 15 in the septic tank to cause an upstream of the gases as indicated by the arrows in the septic tank, and to conduct such upstream outwardly of the tank through a short horizontal pipe 16 to a main duct or vent 17 which rises vertically to a point above the roof of the building 14. The upward movement of the gases in the vent 17 causes a suction upwardly through the vent 17 which draws from the adjacent end of the effluent pipe 18 air which moves in the direction of the arrows from the pure air vent 19 at the far end of the effluent pipe 18. The pure air moving from the pure air inlet 19 toward the tank 5 flows countercurrent in contact with the liquefied sewage which is introduced into the effluent pipe 18 by means of an upwardly angularly directed duct 20 which communicates with the effluent pipe at a point slightly outwardly of its inward end as indicated at 21 and communicates with the interior of the section 6 of the septic tank at 22 at a level which is above the level of the denser portion of the sewage and below the level of the scum thereof. As indicated at 23 the short horizontal pipe 16 is composed of sections which are joined with wiped joints 23 so that the joints are gas and air leakproof, the pipe 16 being of approximately the same cross section as the main duct 17. The lower end of the main duct 17 is connected by a wiped or other suitable gas and air retaining joint 24 to the near inward end of the effluent pipe 18, entering the same at the upper side thereof. Similarly, wiped joints or their equivalents 25 and 26 connect the lower end of the angular pipe 20 with the interior of the septic tank and with the lower side of the effluent pipe 18. The effluent pipe 18 is composed of a plurality of short sections 27, the lower part of the juncture of which as indicated at 28 are left open and unsealed to enable seepage therethrough of the liquefied sewage present in the effluent pipe into the filter bed 29 which underlies the effluent pipe for receiving and purifying the liquefied sewage. The upper parts of the joints as indicated at 30 are closed and sealed. The filter bed 29 and the effluent pipe 18 resting thereon are disposed in a trench 31 which leads from the back of the apparatus below the ground level 13. The ground level adjacent the trench 31 is indicated at 32. It will be observed that the effluent pipe 18 is given a downward slant from the end which is adjacent the septic tank toward the outward end which has the pure air vent 19, so as to gravitationally convey the liquefied sewage passed thereinto by the pipe 20, so as to distribute the liquefied sewage into the filter bed and finally into the ground in purified condition.

Thus it is obvious that the method of purifying and disposing of the sewage according to my invention and as it is made possible by the apparatus described, is to collect in the septic tank the sewage to be treated and disposed of and introduce thereinto any desired chemical or other agents for promoting liquefaction and purification of the sewage, then to utilize the gases produced by the activity of the sewage to cause an upward stream of gases and to control the gas streams in such a way that it draws fresh air from a fresh air inlet, and causes a stream of pure air to travel flow countercurrent and in contact with the liquefied sewage as the liquefied sewage is being gravitationally conveyed from the septic tank and permitted to seep into a filter bed for mechanical purification. The action of the pure air counter current in contact with the liquefied sewage oxidizes and purifies the same and the gaseous products of this reaction are carried along by the air stream and circulated upwardly and discharged through the vent along with the noxious gases coming from the septic tank, at a point higher than the roof of the building in which the apparatus may be located. The method also comprises means for maintaining a constant level of the sewage in the septic tank by providing means for overflowing excess sewage to the gravitational effluent pipe for contact with the countercurrent stream of pure air and seepage into the filter bed and finally into the soil.

It will be observed that the apparatus and the method contemplate positive prevention of escape of gases and odors, access of flies and vermin, and contamination of the surrounding soil.

Though I have shown and described herein preferred embodiments of the invention, it is to be definitely understood that I do not desire to limit the application of the invention thereto, and any change or changes may be made in material, structure and arrangement of parts, and in the sequence and duration and character of the steps involved in the process or method, within the spirit of the invention and the scope of the subjoined claims.

Having thus described my invention, what I claim is:

1. A sewage disposal apparatus comprising a septic tank, means for tightly closing the septic tank, vent means connected to the septic tank for conveying away gases generated therein by the sewage therein, liquid sewage overflow means on the septic tank, effluent means into which said overflow means empties and with which one end of the vent means connects, fresh air inlet means on an outer part of the effluent means, and filter means under and for receiving sewage from the effluent means, gases generated in the septic tank being adapted to rise and produce an upward stream in said vent means and cause fresh air to be drawn through the fresh air inlet means into and through the effluent means countercurrent to the travel of the sewage in the effluent means.

2. A sewage disposal apparatus comprising a septic tank, means for tightly closing the septic tank, vent means connected to the septic tank for conveying away gases generated therein by the sewage therein, liquid sewage overflow means on the septic tank, effluent means into which said overflow means empties and with which one end of the vent means connects, fresh air inlet means on an outer part of the effluent means, and filter means under and for receiving sewage from the effluent means, gases generated in the septic tank being adapted to rise and produce an upward stream in said vent means and cause fresh air to be drawn through the fresh air inlet means into and through the effluent means countercurrent to the travel of the sewage in the effluent means, said overflow means being arranged so as to maintain a constant level of sewage in the septic tank.

3. A sewage disposal apparatus comprising a tank for receiving and holding sewage and sewage treating agents, a vent for the upper part of the tank to enable escape of gas generated by the sewage within the tank, a vertical draft conduit with an intermediate portion of which the vent communicates, an inclined effluent pipe extending away from the tank and having its elevated end adjacent the tank, and connected to the lower end of the draft conduit, an inclined overflow pipe having its depressed end communicating with a lower part of the tank below the normal level of sewage in the tank and its elevated end communicating with the underside of the effluent pipe outward of the point of connection of the lower end of the draft conduit therewith, a filter bed in the ground under and in sewage receiving relation to the effluent pipe, and a fresh air inlet at the outer end of the effluent pipe, the gas rising in the draft conduit acting to draw fresh air into the outer end of the effluent pipe and move the fresh air through the effluent pipe in contact with and countercurrent to the gravitational flow of overflowed treated sewage therein.

SINCLAIR S. CRAWFORD.